Sept. 7, 1954     A. P. GIRAITIS     2,688,641
MANUFACTURE OF ETHYL CHLORIDE
Filed Oct. 28, 1950
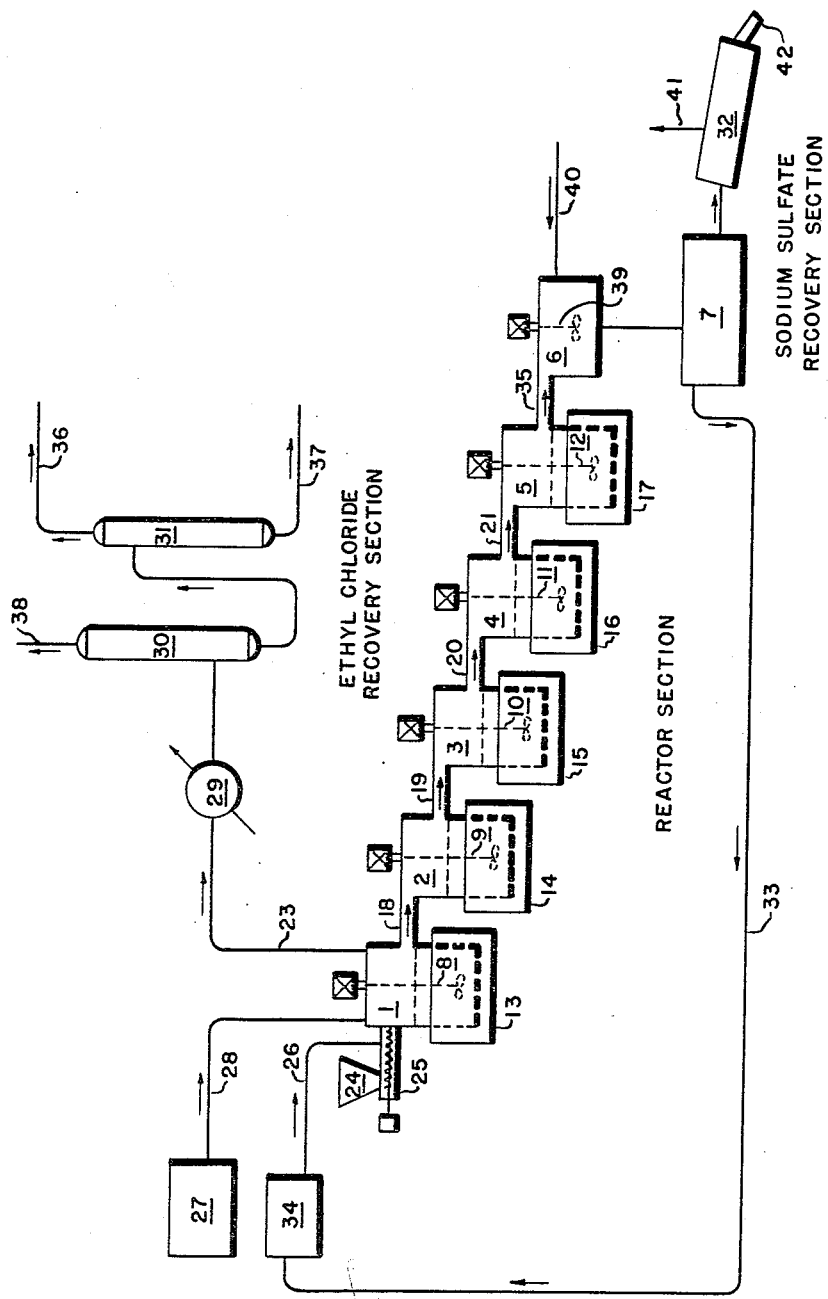
INVENTOR.
ALBERT P. GIRAITIS
BY Kenneth Swartwood Patented Sept. 7, 1954

2,688,641

UNITED STATES PATENT OFFICE 2,688,641

MANUFACTURE OF ETHYL CHLORIDE

Albert P. Giraitis, Baton Rouge, La., assignor to Ethyl Corporation, New York, N. Y., a corporation of Delaware Application October 28, 1950, Serial No. 192,680

7 Claims. (Cl. 260—652)

This invention relates to the manufacture of ethyl chloride. More particularly, the invention relates to a process whereby ethyl chloride can be successfully produced directly from sodium chloride without the necessity of preliminary processing of the salt for its chlorine content, heretofore practiced.

Ethyl chloride is an important industrial chemical, being extensively utilized in the manufacture of tetraethyllead, ethyl cellulose and numerous other chemicals. Heretofore ethyl chloride has been prepared commercially by three processes, viz., the direct chlorination of ethane, the catalyzed hydrochlorination of ethylene, and the reaction of hydrogen chloride gas and ethyl alcohol under the influence of a metal halide catalyst. While these prior processes are fully operable and have been commercially successful, they are all characterized by the requirement that the chloride is necessarily supplied as either elemental chlorine or as hydrogen chloride. This necessitates a preceding process for the purpose of isolating in a usable form the chlorine from the basic source thereof, sodium chloride. This requirement sets limitations on the cost of manufacturing ethyl chloride. In an effort to avoid this common deficiency of former methods, it has been proposed to prepare ethyl chloride by the reaction of sodium chloride and diethyl sulfate. Although potentially very attractive, in directly converting the chlorine content of sodium chloride to ethyl chloride, the process has not heretofore been feasible. It has been found that although ethyl chloride could be produced from these reactants, the yield was low and substantial quantities of the diethyl sulfate were degraded to diethyl ether and ethylene. In addition, sodium ethyl sulfate was produced in appreciable quantities as a by-product, instead of the sodium sulfate desired.

The object of my invention is to provide a process whereby diethyl sulfate and sodium chloride are reacted to produce ethyl chloride and a high purity sodium sulfate. A further object is to obtain higher conversions both of the diethyl sulfate and sodium chloride, than heretofore attainable. Another object is to provide a method of carrying out the reaction whereby the reactants are processed as a thin fluid mixture. A further object is to carry out the reaction at an elevated temperature without appreciable decomposition of the diethyl sulfate. A further object is to ensure substantial completion of the reaction, thereby avoiding formation of sodium ethyl sulfate as an undesired by-product. A still further object is to provide a process of producing sodium sulfate substantially free of acid impurity, thereby eliminating any requirement for a neutralizing agent for subsequent addition.

My process accomplishes the above and additional objects. In its broadest form, the method of the invention comprises reacting sodium chloride and diethyl sulfate in the presence of a liquid diluent or reaction medium, said diluent being stable at the conditions of reaction. By stable at the reaction conditions is meant that the diluent liquid is itself stable at the elevated temperature necessary for an appreciable rate of reaction between the diethyl sulfate and sodium chloride. In addition, as diethyl sulfate is relatively unstable at the reaction temperature, the diluent liquid must also be resistant to chemical attack by diethyl sulfate or any decomposition products thereof.

According to my process, sodium chloride and diethyl sulfate are reacted in the molal proportions of approximately two moles of sodium chloride to one mole of diethyl sulfate. The reaction is carried out in the presence of a selected aromatic diluent liquid. Such aromatic compounds are employed in substantial amounts. In a typical continuous flow process, for example, the diluent liquid is fed in an amount at least equal in weight to the diethyl sulfate fed, and preferably in the proportions of two to three parts by weight to one part of diethyl sulfate fed.

The process is carried out at elevated temperatures above 130° C., and preferably in the range of 150° to about 200° C., and is continued until substantially all the sodium chloride originally fed is reacted. The ethyl chloride is withdrawn as a vapor product as rapidly as it is formed, being separately liquefied for recovery and purification. The non-volatile mixture discharged from the reaction zone comprises an intimate mixture of solid sodium sulfate in the medium of the stabilizing diluent. The sodium sulfate is then separated from the liquid reaction medium and purified thereof, to form a valuable and marketable by-product.

The advantages of and method of operating the process will be more fully understood from the following detailed description and examples and the figure, the figure being a schematic flow diagram illustrating a typical and preferred mode of operating the process.

The particular benefits of my process arise from the use of a liquid reaction medium which minimizes decomposition of diethyl sulfate at reaction conditions and in addition is strongly resistant to such minor amounts of decomposition products as are released. It has been found that a concentrated diethyl sulfate tends to decompose at a relatively rapid rate at temperatures which are required for an appreciable reaction rate between the diethyl sulfate and sodium chloride. Thus, at temperatures of the order of 150° C. or above, an economic yield of ethyl chloride has heretofore been impossible owing to the concurrent release of decomposition products by the diethyl sulfate. These decomposition products include ethylene and ether which are released as gases at reaction temperatures. The evolution of gaseous decomposition products is difficult to efficiently transport, pump, or otherual decomposition products which are acid in character such as ethyl hydrogen sulfate and sulfuric acid. A further disadvantage of prior methods lies in the pasty or semisolid character of a reacting mixture of only diethyl sulfate and sodium chloride, owing to the disappearance of liquid phase by reaction or decomposition. It is difficult to efficiently transport, pump, or otherwise process a pasty mixture of this type.

It has now been discovered that the decomposition of diethyl sulfate can be substantially minimized by the use of certain liquid reaction media which are resistant to the normal acidic products of decomposition at the reaction conditions. Thus, although some slight decomposition of diethyl sulfate does occur, the reaction media or diluents employed in the process are resistant to attack by any trace decomposition products as are present, in addition to minimizing such decomposition.

A liquid diluent for my process must, therefore, be stable at reaction conditions in addition to providing a substantial repression of decomposition of diethyl sulfate. By stable at reaction conditions is meant that the diluent liquid must be inherently thermally stable at the temperatures required for reaction, and in addition must be chemically resistant to attack by any acidic products of such decomposition as does occur. In addition to being stable at reaction conditions, for the full benefits of the process, the diluent liquid must exhibit certain additional characteristics. The liquid should be miscible with the diethyl sulfate so as to provide a continuous liquid phase in the reaction zone. In addition, the liquid should exhibit high fluidity over an appreciable temperature range and particularly in the preferred range of reaction temperatures. An additional desirable factor is that the vapor pressure at reaction conditions should be relatively low to facilitate maintaining diluent medium in the liquid phase without the necessity of condensing and refluxing at a high rate.

Numerous compounds have been found which are useful for the purposes of the process. In general, these effective materials are all aromatic organic materials, although they may have substituents which may include alkyl groups. The useful aromatic compounds include fused ring compounds, and also polynuclear compounds containing a plurality of aromatic rings. In addition, polysubstituted benzene compounds are effective.

Specific examples of compounds which are particularly effective for the process are naphthalene, diphenyl oxide, ortho-aminodiphenyl, cresols and acenaphthene. Numerous other compounds well known in the arts are available and suitable for the process. The preferred types of compounds for the process are the fused ring compounds and those which contain a plurality of benzene rings. Typical of the latter group are diphenyl, diphenyl oxide or phenyl ether, fluorene, and ortho-aminodiphenyl. These groups are preferred, although compounds having only a single benzene ring are adequate, providing that the benzene ring has a plurality of substituents. In the case of such compounds, having only a single benzene nucleus, such substituents materially provide the desired stabilizing effect at reaction conditions in addition to contributing to the low vapor pressure desired for full effectiveness in the process. Examples of such effective compounds having a single benzene ring are the several cresols and ethyl benzene sulfonate.

The efficacy of these reaction medium compounds is readily apparent from a simple heating test in the presence of diethyl sulfate. Thus, equal parts of diphenyl oxide and diethyl sulfate can be mixed and heated to an elevated temperature in the range of 150° to 200° C., and maintained at this elevated temperature for several hours, with no appreciable decomposition. The liquid mixture remains clear and no precipitate is formed. In contrast, in making a similar test with a mixture of saturated aliphatic liquid hydrocarbons, heating to 160° C. resulted in copious fume evolution. Attack of the hydrocarbon mixture was evidenced by the discoloration or blackening of the liquid. The odor of sulfur dioxide was apparent in the gaseous products of decomposition. This instability at reaction conditions was evidenced in similar pronounced degree in corresponding tests with numerous other aliphatic compounds including hydroxy compounds, ethers, and esters.

The beneficial action of the aromatic compounds used as diluents has not been explained on a theroetical basis, but is apparently a performance attribute accompanying the combination of an aromatic ring with other rings, either fused or otherwise linked, or a plurality of substituents. With regard to substituents on compounds of the fused ring or plural ring type, they do not usually provide additional benefits, and in some instances are disadvantageous in that the inherent stability of the compound itself is reduced. The relative absence of beneficial effect from specific substituents is, of course, an advantageous factor, in that the simple compounds of the fused ring or plural ring type are readily available and are most economical. The substituents may be either alkyl groups or negative groups. By negative groups is meant the usual acid radicals, such as halogens, a sulfonic acid group, carboxylic acid radicals, or an amino group, and the like.

Mixtures of compounds which are frequently available as by-product streams, can be used. In other words, it is by no means essential that the diluent be a high purity single compound. It is only necessary that the materials in the reaction zone, other than the reactants and products, comprise a predominant amount of the materials of the invention. In other cases, specific mixtures have particular properties which render them especially advantageous. An example of the latter is the eutectic mixture of about 73.5 percent by weight diphenyl oxide with diphenyl. The melting points of diphenyl oxide and diphenyl are 28° C. and 70° C. respectively. The eutectic mixture, however, is a mobile liquid at quite low temperatures, as well as exhibiting to a high degree the other necessary characteristics. The eutectic mixture of diphenyl oxide and diphenyl is, accordingly, used in a preferred embodiment of the invention.

As previously indicated, the figure is a schematic flow diagram illustrating how numerous embodiments may be carried out in a continuous manner. Referring to the figure, the main units of the apparatus are a series of reactors 1, 2, 3, 4, 5, a sodium sulfate recovery system including a washer 6, a settler 7, and a dryer 32, and an ethyl chloride recovery section including fractionators 30, 31. The reactors are provided with agitating means 8, 9, 10, 11, 12 and packets 13, 14, 15, 16, 17 whereby the reaction vessel and contents can be maintained at the desired reaction temperature and the contents kept thoroughly mixed during reaction. Overflow lines 18, 19, 20 and 21 provide gravity flow of the reacting mixture through the reaction vessels, and also provide a channel whereby the ethyl chloride vapors produced flow to the common discharge point from reactor 1, through line 23.

Salt is fed to the reaction system from hopper 24, by a seal conveyor 25. The reaction medium or diluent is also fed, by line 26, to the conveyor 25 and thence to the initial reactor 1, the introduction of the liquid in this manner insuring that a gas tight seal is effected and loss of ethyl chloride product vapors is prevented. The diethyl sulfate reactant is fed from storage tank 27 through line 28 to reactor 1.

The product vapor stream, discharged from the reactor section through line 23, flows to condenser 29 where it is cooled sufficiently to liquefy virtually all the ethyl chloride content. The cooled stream of liquid and non-condensed gases then passes to an ethyl chloride recovery system comprising two fractionators 30 and 31. Impurities which are more volatile than ethyl chloride are stripped in fractionator 30 and discharged in overhead line 38. Bottoms from fractionator 30 are fed to final fractionator 31, wherein impurities less volatile than ethyl chloride are removed as a bottoms stream and discharged in line 37. The purified ethyl chloride is discharged as an overhead stream in line 36.

Recovered reaction medium, separated in settler 7, is returned by line 33 to supply tank 34 for reuse in the reactor system.

The following working example of operation in the above described equipment illustrates the efficient manner of operation of a continuous process embodiment of the invention.

*Example I*

Granular sodium chloride and diethyl sulfate are continuously fed to the reaction system through seal conveyor 25 and line 28 respectively, in the proportions of 1000 parts of salt and 1550 parts of diethyl sulfate. Concurrently, a eutectic mixture of diphenyl oxide and diphenyl, containing 73.5 weight percent diphenyl oxide, is fed through line 26 to seal conveyor 25, in proportions of about 3700 parts.

The reactors are maintained at progressively increasing temperatures, in the range of 160° to 180° C., reactor 1 being kept at 160° C., reactor 2 at 165° C., reactor 3 at 170° C., etc. The reacting mixture is a relatively thin and mobile slurry in each reaction vessel.

The ethyl chloride generated in each reactor passes counter-currently to the flow of non-gaseous components and is discharged from the reaction train through line 23 to condenser 29. The liquefied stream from the condenser is then fed to fractionating columns 30 and 31, which free the ethyl chloride of both more volatile and less volatile impurities. The purified ethyl chloride amounts to 1050 parts, corresponding to a conversion of 95 percent of the sodium chloride.

The overflow from the final reactor 5 contains the reaction medium, the sodium sulfate resulting from the reaction, and small amounts of unreacted diethyl sulfate and sodium chloride. About 5000 parts of water are added through line 40 to the sodium sulfate-diphenyl oxide-diphenyl reacted stream in mixer 6, and is agitated by stirrer 39 to effect intimate contact therewith. The resultant mixture is then discharged to the settler 7 and the aqueous phase, containing the sodium sulfate in solution, is decanted and fed to dryer 32. Here the water is evaporated and discharged through line 41 producing approximately 1160 parts of sodium sulfate, or salt cake, containing only several percent sodium chloride impurity, the salt cake being discharged through chute 42.

The non-aqueous phase, consisting primarily of the diphenyl oxide-diphenyl mixture, is recycled through line 33 to supply 34 for re-use in the reaction train.

The general procedure of the above example is conveniently utilized in other continuous embodiments of the process with other reaction or diluent liquids. In some instances it will be necessary to provide supplementary equipment or to revise the conditions of operation with variations in the melting point, vapor pressure, or other physical properties of the aromatic liquid reaction medium.

In addition to the multi-stage reaction arrangement illustrated by the foregoing example, the process is also efficiently carried out in single stage reactors, either operated continuously or batchwise. The following example describes a single stage process using naphthalene as the reaction medium.

*Example II*

Diethyl sulfate, sodium chloride and molten naphthalene are fed to a stirred reaction vessel in the proportions of 130, 100 and 215 parts by weight, respectively. The reactor and charge are maintained at a temperature of from 190 to 200° C. Under these reaction conditions, the reactant mixture is a thin, easily stirred slurry which releases the gaseous products of reaction without appreciable foaming. No decomposition or carbonization is noted in batch processing for reaction periods of two to three hours.

The overhead or gaseous products are cooled to condense the ethyl chloride produced, which is obtained at the relatively high purity of about 90 weight percent, prior to final purification. The reacted mixture, on termination of the reaction, can be easily filtered to segregate the sodium sulfate produced. The sodium sulfate or salt cake is preferably washed with a solvent such as ethyl chloride to remove residual adherent amounts of the naphthalene which are retained by the solids during a mechanical separation such as filtering or centrifuging. The sodium sulfate is thereby obtained as a white or light colored, marketable by-product. A yield of approximately 90 percent, on the basis of the salt fed, is obtained. Higher yields are obtained by slightly longer reaction periods at lower temperatures.

In carrying out the above embodiment, it is preferred to maintain the naphthalene in the fluid state throughout the system. This is done by utilizing heated storage vessels and lines and thereby maintaining the naphthalene above 80° C. at all points in the process.

As heretofore stated, numerous other compounds can be advantageously used for the purposes of the invention, the foregoing examples being only illustrative of the operation of the process. Thus, the reaction of sodium chloride and diethyl sulfate can be carried out using one or more of the following compounds as reaction liquids and equally good results will be obtained: diphenyl, diphenyl oxide, fluorene, 1-methyl naphthalene, 1-chloronaphthalene, acenaphthene, ethyl benzene sulfonate, ortho-biphenylamine, cresols, quinoline, quinaldine, 1,4-ditertiary butylbenzene, triethylbenzenes, hexa-ethylbenzene, naphthyl phenyl methane, dimethyl naphthalene, 2-benzylbiphenyl, butyl toluenes, ethyl tolyl ethers, propyl toluenes, 1,3-diphenyl benzene, ethyl isopropyl benzenes, pentaethylbenzene, trichlorobenzenes, tetraethylbenzenes, xylidenes, analine and diphenyl methane.

To illustrate the improvement effected according to the present invention, the following examples show the difficulties encountered in operations as previously attempted.

*Example III*

A reaction vessel fitted with a stirrer or agitator and a heating jacket was charged with 15,800 parts by weight of diethyl sulfate and 1000 parts of sodium chloride. The mixture was stirred and heated for a period of about three hours, at temperatures which were gradually increased in the range of 135 to 160° C. The reaction mixture, during this period, gradually increased in thickness or viscosity, and was a thick pasty mass which could not be successfully stirred, at the conclusion of the operation.

The reaction evolved gaseous and vaporous products, which were passed through a condenser for cooling to well below 0° C. and liquefaction of condensible materials. The condensate from the vapor products contained some ethyl chloride, but was predominantly (70 weight percent) diethyl ether. The results showed that the conversion of the salt charged to ethyl chloride was below 50 percent. In addition to the condensate recovered from the vapor product stream, an appreciable amount of non-condensible gases were produced, which contained approximately 70 volume percent ethylene.

The residue in the reactor on the termination of the reaction included a liquid and a solid phase. The solids were found to be sodium ethyl sulfate, the liquid being excess diethyl sulfate. No sodium sulfate was recoverable from the reaction.

The foregoing example shows that the reaction of diethyl sulfate and sodium chloride, in the absence of a stabilizing reaction medium as used in my improved process, is virtually unworkable with respect to obtaining useful conversion to ethyl chloride. In addition, there is no recoverable production of the desired by-product, sodium sulfate.

A simple diluent effect is important in the improved process, but is itself not sufficient to insure all the desired results. In other words, the reaction medium should exhibit the mutual stabilizing effect on and in the presence of the diethyl sulfate reactant, in addition to being normally stable at the reaction temperatures. The following example shows the results obtained when a reaction medium having only a diluent effect is used.

*Example IV*

Ground sodium chloride and diethyl sulfate were introduced to a reactor provided with an agitator, in the proportions of 100 and 133 parts by weight, respectively. Approximately 370 parts of U. S. P. mineral oil was then added as a reaction diluent. This hydrocarbon fraction is a highly refined white oil, having approximately the fluidity of S. A. E. No. 10 motor oil, but water white in color and consisting exclusively of saturated hydrocarbons.

The reaction mixture was stirred and heated for two hours at a temperature of 220–225° C. The vaporized products were cooled to below 0° C. for liquefaction of the ethyl chloride produced, and collection of other liquefiable by-products. This condensate analyzed 87 weight percent ethyl chloride and 13 percent diethyl ether.

Only three-fourths of the sodium chloride fed was reacted so that the solids content of the reactor residue contained over 20 weight percent unreacted sodium chloride.

Although the reaction mixture has sufficiently high fluidity during reaction to allow efficient agitation, there was appreciable undesired diethyl ether formation. In addition, decomposition in the reacting mixture resulted in appreciable carbon formation. As a result of such decomposition, the solids were difficultly separable from the spent reaction mixture. In addition, after separation, the sodium sulfate-sodium chloride solids were dark gray in appearance instead of being white as required for a marketable product.

It will be apparent from the foregoing example that a mere diluent effect is not adequate in itself to ensure the benefits which are realized by my improved process.

Among the advantages of the process, the ease of separation of the sodium sulfate product from the reacted mixture is an important practical feature. It has been found that the product mixture can be intimately mixed with water in sufficient quantity to dissolve the sodium sulfate content, and the aqueous and nonaqueous phases are then easily separable by a simple settling or decantation operation. On the other hand, if it is desired to avoid the necessity of evaporating an aqueous solution, an anhydrous separation technique can easily be utilized. A suitable anhydrous method involves the filtration or centrifuging separation of the solid sodium sulfate. The solids, still wet or cooled with the diluent medium, are rinsed or washed with liquid ethyl chloride which dissolves and removes the reaction medium. This wash liquid can be cycled to the reaction zone where the ethyl chloride content is flashed off and recovered along with the newly produced ethyl chloride. The sodium sulfate, freed in the above manner of residual reaction medium, but wet with ethyl chloride, is quickly dried by slight warming or by passing a stream of gas over the sodium sulfate.

The quantity used of diluent organic aromatic compound, is necessarily at least equal to, and preferably substantially in excess of, the diethyl sulfate fed to the reaction. The benefit of the method with respect to minimizing decomposition and obtaining high yields are obtained at a freed proportion of one weight of diluent to one of diethyl sulfate. However, a particular practical benefit of the process arises from the mobility or fluidity of the reacting mixture, which enables the reacting materials and product mixture to be conveniently handled as if it were entirely liquid. To achieve this additional benefit, it is preferred to utilize the diluent compound in the proportions of at least two parts by weight to one part of diethyl sulfate fed. No particular benefit is achieved by using more than three parts; the preferred range therefore being from two to three parts of diluent compound per one part of diethyl sulfate.

The diethyl sulfate is preferably fed to the reaction system in slight excess over the quantity theoretically required for complete reaction with the sodium chloride fed. An excess of diethyl sulfate promotes a high conversion of the sodium chloride to ethyl chloride. In addition, the unreacted diethyl sulfate is recoverable by means of recycling to the reaction train along with the diphenyl oxide containing reaction medium. The preferred ratio of feed components is from 0.5 to 0.6 moles of diethyl sulfate per mole of sodium chloride fed.

The residence time of the reacting components can be varied through a wide range. The necessary residence period is affected to some extent by the particle size of the sodium chloride fed. In this regard, it has been found that a finely ground sodium chloride permits a shorter residence time. However, a residence time of from 1.5 to 3.0 hours is normally preferred, this range being sufficient to provide the substantially complete conversion desired, with the commercially used grades of sodium chloride.

The process is, of course, capable of being utilized in batch operations and the same principles as heretofore described will apply. In practically all commercially installations, a continuous operation will be preferred because of the inherent advantages in that mode of operation. It will be apparent that numerous embodiments, in addition to the examples given herein, are possible within the scope of the invention as defined in the following claims.

I claim:

1. In a process for manufacturing ethyl chloride by heating a mixture of diethyl sulfate with sodium chloride, the improvement in which the heating is carried out at a temperature above 130° C., the diethyl sulfate to sodium chloride mol ratio is between 0.5 and 0.6, and the reaction mixture contains a reaction medium selected from the class consisting of naphthalene, diphenyl, diphenyl oxide, fluorene, 1-methyl naphthalene, 1-chloronaphthalene, acenaphthene, ethyl benzene sulfonate, ortho-biphenyl amine, cresols, quinoline, quinaldine, 1,4-ditertiary butyl benzene, triethyl benzenes, hexaethyl benzene, naphthyl phenyl methane, dimethyl naphthalene, 2-benzyl biphenyl, butyl toluenes, ethyl tolyl ethers, propyl toluenes, 1,3-diphenyl benzene, ethyl isopropyl benzenes, pentaethyl benzene, trichloro benzenes, tetraethyl benzenes, xylidines, aniline, diphenyl methane and mixtures thereof, the proportion of the reaction medium being such as to produce a mixture that is freely fluent throughout the reaction.

2. The invention of claim 1 in which the reaction medium is naphthalene.

3. The invention of claim 1 in which the reaction medium is a trichlorobenzene.

4. The invention of claim 1 in which the reaction medium is a cresol.

5. The invention of claim 1 in which the reaction medium is 1-methylnaphthalene.

6. The invention of claim 1 in which the reaction medium is present in the reaction mixture in a proportion of from two to three parts by weight with respect to the diethyl sulfate.

7. A continuous process of manufacturing ethyl chloride and anhydrous sodium sulfate, comprising feeding diethyl sulfate and sodium chloride to a reaction medium in proportions of from 0.5 to 0.6 mole of diethyl sulfate to one mole of sodium chloride, and in proportions of from one-half to one-third part by weight to one part of the reaction medium, the reaction medium comprising a eutectic mixture of diphenyl and diphenyl oxide, dissolving the diethyl sulfate in the said reaction medium and reacting with the sodium chloride at a temperature of 150 to 200° C., whereby ethyl chloride vapor is generated and solid anhydrous sodium sulfate is precipitated, withdrawing the ethyl chloride vapor and separating the anhydrous sodium sulfate from the reaction medium.

References Cited in the file of this patent

UNITED STATES PATENTS

| Number | Name | Date |
| --- | --- | --- |
| 2,263,666 | Wilson | Nov. 25, 1941 |
| 2,398,179 | Galitzenstein et al. | Apr. 9, 1946 |

FOREIGN PATENTS

| Number | Country | Date |
| --- | --- | --- |
| 175,209 | Germany | Sept. 14, 1906 |